United States Patent [19]

Shiobara et al.

[11] Patent Number: 5,166,228

[45] Date of Patent: Nov. 24, 1992

[54] EPOXY RESIN COMPOSITIONS CONTAINING POLYSUBSTITUTED NOVOLAC EPOXY RESINS AND NAPHTHYLENE BASED PHENOLIC RESIN CURING AGENTS AND SEMICONDUCTOR DEVICES ENCAPSULATED THEREWITH

[75] Inventors: Toshio Shiobara, Annaka; Kazutoshi Tomiyoshi, Takasaki; Koji Futatsumori, Annaka; Takashi Tsuchiya, Takasaki; Takayuki Aoki, Annaka, all of Japan

[73] Assignee: Shin-Etsu Chemical Co., Ltd., Tokyo, Japan

[21] Appl. No.: 739,447

[22] Filed: Aug. 2, 1991

[30] Foreign Application Priority Data

Aug. 14, 1990 [JP] Japan .................................. 2-214589

[51] Int. Cl.$^5$ .................... C08G 59/32; C08L 63/00
[52] U.S. Cl. .................................. 523/443; 523/466; 525/476; 525/481; 525/482; 528/97
[58] Field of Search .................. 528/97; 525/481, 482, 525/476; 523/466, 443

[56] References Cited

U.S. PATENT DOCUMENTS

| | | | |
|---|---|---|---|
| 4,390,664 | 6/1983 | Kanayama | 528/98 |
| 5,001,174 | 3/1991 | Yanagisawa et al. | 523/466 |

FOREIGN PATENT DOCUMENTS

| | | | |
|---|---|---|---|
| 0415790 | 3/1991 | European Pat. Off. | 525/481 |
| 62-167318 | 7/1987 | Japan | 525/481 |
| 63-159419 | 7/1988 | Japan | 525/481 |
| 3000717 | 1/1991 | Japan | 525/481 |
| 2095678 | 10/1982 | United Kingdom | 525/481 |

*Primary Examiner*—John C. Bleutge
*Assistant Examiner*—Frederick Krass
*Attorney, Agent, or Firm*—Birch, Stewart, Kolasch & Birch

[57] ABSTRACT

An epoxy resin composition comprising (A) a specific epoxy resin, (B) a phenolic resin having at least one naphthalene ring in a molecule, and (C) an inorganic filler has improved flow and cures into products having a low coefficient of expansion, high Tg, and low moisture absorption. The composition is suitable for encapsulating semiconductor devices.

8 Claims, 1 Drawing Sheet

EPOXY RESIN COMPOSITIONS CONTAINING POLYSUBSTITUTED NOVOLAC EPOXY RESINS AND NAPHTHYLENE BASED PHENOLIC RESIN CURING AGENTS AND SEMICONDUCTOR DEVICES ENCAPSULATED THEREWITH

This invention relates to epoxy resin compositions having improved flow and curing into products having a low coefficient of expansion, a high glass transition temperature, and low moisture absorption and semiconductor devices encapsulated with cured products of such epoxy resin compositions.

BACKGROUND OF THE INVENTION

The mainstream of the modern day semiconductor industry involves resin encapsulated diodes, transistors, IC, LSI, and super LSI. Among various resin compounds for encapsulating semiconductor devices, epoxy resin compositions comprising curable epoxy resins blended with curing agents and various additives are most widely used because they are generally improved in moldability, adhesion, electrical properties, mechanical properties and moisture resistance over the rest of thermosetting resins. The present day trend for these semiconductor devices is toward an increasingly high degree of integration and increased chip size therewith. Packages, on the other hand, are desired to be smaller and thinner in outer dimensions to meet the demands of compactness and light weight for electronic equipment. Further, as to the mounting of semiconductor parts on circuit boards, surface packaging of semiconductor parts is now often employed for reasons of increased part density on boards and reduced board thickness.

A common approach to the surface packaging of semiconductor parts is to dip entire semiconductor devices in a solder bath or to pass them through a hot zone of molten solder. Thermal shocks associated with this process cause encapsulating resin layers to crack or incur separation at the interface between the lead frames and chips and the encapsulating resin. Such cracks and separation become more outstanding if the semiconductor device encapsulating resin layers have absorbed moisture prior to thermal shocks encountered during surface packaging. Since encapsulating resin layers, however, inevitably absorb moisture in practical manufacturing steps, epoxy resin-encapsulated semiconductor devices after packaging sometimes suffer from a loss of reliability.

SUMMARY OF THE INVENTION

The present invention has been made to overcome the problems of the prior art, and its object is to provide a new and improved epoxy resin composition exhibiting improved flow behavior and curing into products having a low coefficient of expansion, low stress, a high glass transition temperature, and low moisture absorption. Another object is to provide a semiconductor device encapsulated with a cured product of the epoxy resin composition which remains fully reliable after thermal shocks during surface packaging.

The inventors have found that by blending (A) an epoxy resin of the general formula (I):

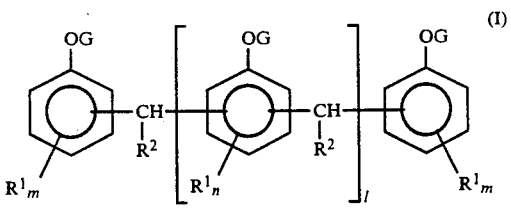

wherein
G is

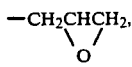

$R^1$ is independently selected from alkyl groups having 1 to 10 carbon atoms,
$R^2$ is a hydrogen atom or a group represented by the formula (a):

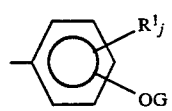

wherein $R^1$ and G are as defined above and j is an integer of from 0 to 4, and
letter m is an integer of from 2 to 4, n is an integer of from 0 to 3, and l is an integer of from 0 to 4
with (B) a curing agent in the form of a phenolic resin having at least one substituted or unsubstituted naphthalene ring in a molecule and (C) an inorganic filler, there is obtained an epoxy resin composition which has improved flow and cures into a product having a low coefficient of expansion and low stress as characterized by a lowering of modulus of elasticity in a temperature range above its glass transition temperature. As opposed to prior art conventional epoxy resin compositions which were obtained by a method designed so as to provide low modulus of elasticity and accompanied by such drawbacks as a lowering of glass transition temperature and a loss of strength, the epoxy resin composition as presently formulated can yield cured products having improved properties which were not found in the conventional epoxy resin compositions, that is, cured products which are free of a lowering of glass transition temperature irrespective low modulus of elasticity and absorb little moisture. In addition, semiconductor devices encapsulated with cured products of the presently formulated epoxy resin composition remain highly reliable after thermal shocks during surface packaging. Therefore, the presently formulated epoxy resin composition is applicable to the encapsulation of semiconductor devices of all types including SOP, SOJ, PLCC and flat pack types since it has quite improved properties as encapsulants for surface packaging semiconductor devices.

Based on the above finding, the present invention provides an epoxy resin composition comprising
(A) an epoxy resin having the general formula (I) described above,
(B) a phenolic resin having at least one substituted or unsubstituted naphthalene ring in a molecule, and
(C) an inorganic filler.

BRIEF DESCRIPTION OF THE DRAWING

The only figure.

DESCRIPTION OF THE PREFERRED EMBODIMENTS

Figure 1:
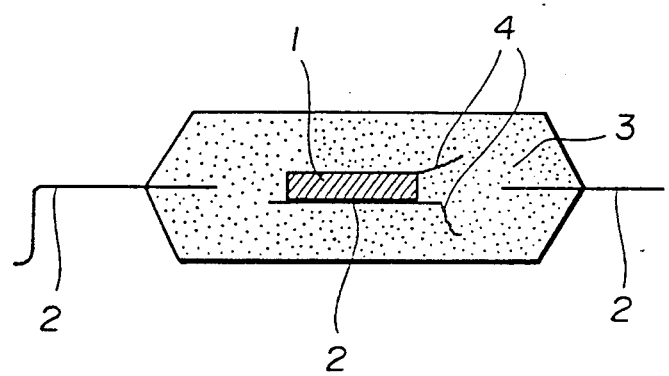
FIG. 1 is a cross sectional view of an SO package in a crack resistance test by soldering after moisture absorption, showing cracks in the package.

As defined above, the epoxy resin composition of the present invention is comprised of (A) an epoxy resin, (B) a phenolic resin, and (C) an inorganic filler.

Component (A) is an epoxy resin of general formula (I):

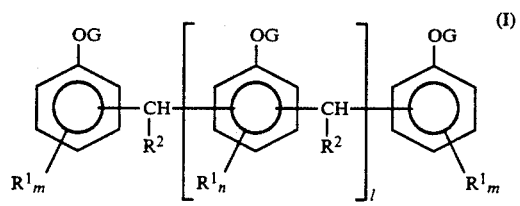

wherein
G is

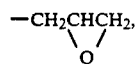

$R^1$ groups are identical or different alkyl having 1 to 10 carbon atoms, $R^2$ is a hydrogen atom or a group represented by the formula (a):

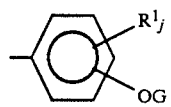

wherein $R^1$ and G are as defined above and j is an integer of from 0 to 4, and letter m is an integer of from 2 to 4, n is an integer of from 0 to 3, and l is an integer of from 0 to 4.

Preferred among the epoxy resins of formula (I) are those represented by formula (IA):

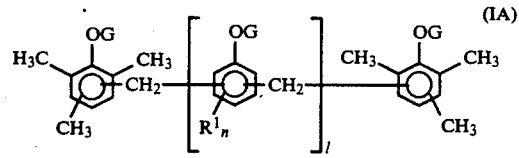

wherein $R^1$, G, n and l are defined above.

Illustrative, non-limiting examples of the epoxy resin of formula (I) are given below.

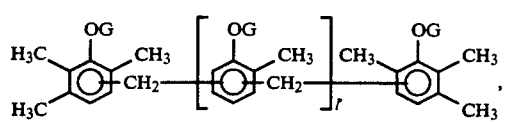

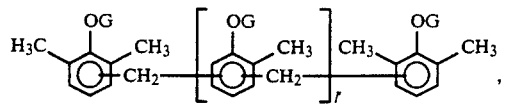

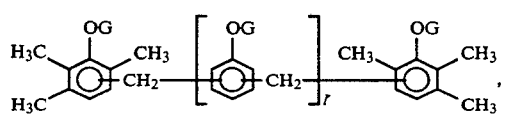

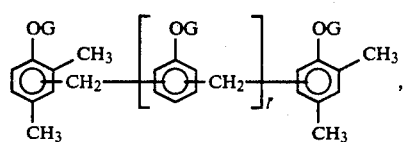

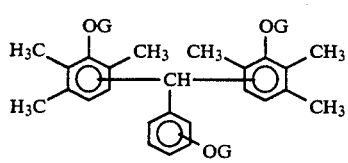

In the formulae, l' is an integer of from 1 to 3.

These epoxy resins may be used alone or in admixture of two or more.

In the practice of the present invention, the epoxy resin composition may contain another epoxy resin or resins in addition to the epoxy resin of formula (I). Examples of the additional epoxy resin include bisphenol-A type epoxy resins, cresol novolak type epoxy resins, triphenol alkane type epoxy resins, and naphthalene type epoxy resins. Preferably, the additional epoxy resin is blended in an amount of 0 to about 50 parts by weight per 100 parts by weight of the epoxy resin of formula (I).

Component (B) is a curing agent for epoxy resin (A), which is a phenolic resin having at least one substituted or unsubstituted naphthalene ring in a molecule. A blend of an epoxy resin with such a phenolic resin having a naphthalene ring as a curing agent yields cured products having a low coefficient of expansion, a high glass transition temperature, a low modulus of elasticity in a temperature range above the glass transition temperature, and low moisture absorption. Then by using the epoxy resin composition of the invention as an encapsulant for semiconductor devices, the resulting semiconductor devices are improved in crack resistance upon thermal shocks and reliability after thermal shocks.

Illustrative, non-limiting examples of the phenolic resin having a naphthalene ring are given below.

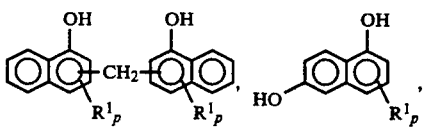

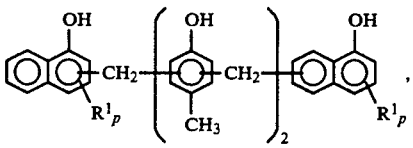

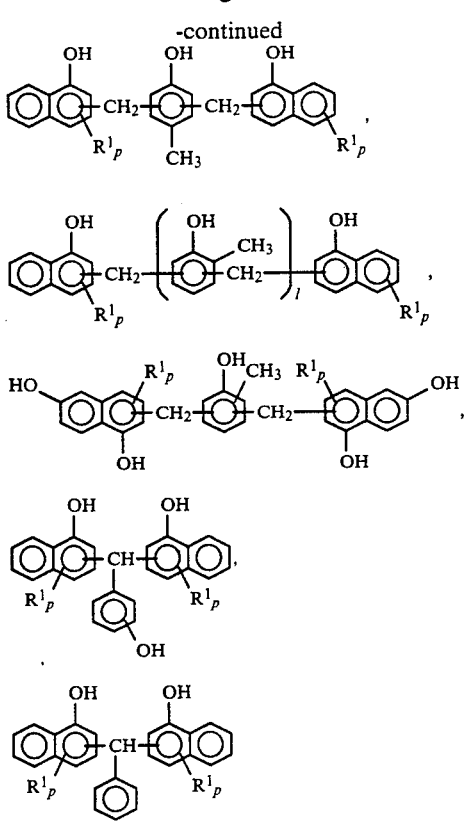

In the formulae, $R^1$ and $l$ are as defined above, and $p$ is an integer of from 0 to 2.

In the practice of the invention, these phenolic resins may be used alone or in admixture of two or more as a main curing agent for the epoxy resin. If desired, another curing agent may be additionally used. The other curing agents which can be used along with the phenolic resins include phenolic resins such as novolak type phenolic resins, resol type phenolic resins, phenol aralkyl resins, triphenol alkane type resins and polymers thereof; amine curing agents such as diaminodiphenylmethane, diaminodiphenylsulfone, and metaphenylenediamine; and acid anhydride curing agents such as phthalic anhydride, pyromellitic anhydride, and benzophenonetetracarboxylic anhydride.

The content of naphthalene ring is preferably 5 to 80% by weight, more preferably 10 to 60% by weight based on the total weight of epoxy resin (A) and phenolic resin (B). With a naphthalene ring content of less than 5% by weight, the resulting cured products would be less improved in crack resistance upon thermal shocks after moisture absorption since the moisture absorption and the modulus of elasticity in a temperature range above the glass transition temperature are insufficiently reduced. With a naphthalene ring content of more than 80% by weight, problems will arise with respect to dispersion upon preparation and moldability.

Desirably, components (A) and (B) contain epoxy and phenolic hydroxyl groups in such quantities that the ratio of the quantity of epoxy group (a mol) to the quantity of phenolic hydroxyl group (b mol), a/b, ranges from ½ to 3/2. Outside the range, curing property and low stress are sometimes lost.

Component (C) is an inorganic filler which may be selected from those commonly used for epoxy resins. Examples include silicas such as fused silica and crystalline silica, alumina, carbon black, mica, clay, kaoline, glass beads, glass fibers, aluminum nitride (AlN), zinc white, antimony trioxide, calcium carbide, aluminum hydroxide, beryllium oxide (BeO), boron nitride (BN), titanium oxide, silicon carbide (SiC), iron oxide or the like. These inorganic fillers may be used alone or in admixture of two or more. The filler is preferably used in an amount of 100 to 1,000 parts, especially 200 to 700 parts by weight per 100 parts by weight of the total of components (A) and (B) although the filler content is not particularly limited.

A curing catalyst may be blended in the epoxy resin composition of the invention. The curing catalysts used herein include imidazoles, tertiary amines, and phosphorus compounds. The preferred curing catalysts are mixtures of 1,8-diazabicyclo(5.4.0)undecene-7 and triphenylphosphine in a weight ratio of from 0:1 to 1:1, especially from 0.01:1 to 0.5:1. A higher proportion of 1,8-diazabicyclo(5.4.0)-undecene-7 beyond this range would sometimes lead to a lower glass transition temperature. The amount of the curing catalyst added is not particularly limited although it is preferably added in an amount of 0.2 to 2 parts, more preferably 0.4 to 1.2 parts by weight per 100 parts by weight of the total of components (A) and (B).

For the purpose of imparting a low coefficient of linear expansion, low modulus of elasticity and moisture resistance to the epoxy resin composition of the invention, silicone-modified epoxy or phenolic resins are desirably blended. The silicone-modified epoxy or phenolic resins used herein are preferably polymers obtained by reacting an alkenyl group-containing epoxy or phenolic resin with an organic silicon compound of the general formula (II):

wherein $R^3$ is a substituted or unsubstituted monovalent hydrocarbon group having 1 to 6 carbon atoms, hydroxyl group, alkoxy group having 1 to 3 carbon atoms, or alkenyloxy group having 2 to 3 carbon atoms, letters b and c are positive numbers meeting $0.001 \leq b < 1$, $1 \leq c < 3$, and $1 \leq b+c < 4$, the number of silicon atoms in a molecule is an integer of from 20 to 400, and the number of hydrogen atoms directly attached to silicon atoms is an integer of at least 1, preferably 1 to 5, more preferably 2 to 3 in a molecule, thereby adding a $\equiv$SiH group of the organic silicon compound to an alkenyl group of the epoxy or phenolic resin. The alkenyl group-containing epoxy and phenolic resins used herein are preferably of the following formula:

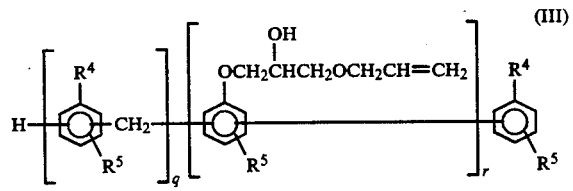

wherein $R^4$ is

or a hydroxyl group, $R^5$ is a methyl group or hydrogen atom, and letters q and r are $0 \leq q \leq 10$ and $1 \leq r \leq 3$.

The silicone-modified epoxy and phenolic resins used herein are preferably such that the content of hydrolyzable chlorine is up to 500 ppm, the contents of free Na and Cl ions are both up to 2 ppm, and the content of organic acid is up to 100 ppm. With contents of hydrolyzable chlorine, free Na and Cl ions, and organic acid beyond the above-defined ranges, some encapsulated semiconductor devices become less heat resistant. The silicone-modified epoxy and phenolic resins may be used alone or in admixture of two or more, preferably in an amount of about 5 to about 50 parts by weight per 100 parts by weight of the total of epoxy resin (A) and phenolic resin (B). Less than about 5 parts of the silicone-modified resin would be too small to provide low stress property whereas more than about 50 parts would result in molded products having low mechanical strength.

The composition of the invention may further contain various well-known additives if desired. Exemplary additives include stress lowering agents such as thermoplastic resins, thermoplastic elastomers, organic synthetic rubbers, and silicones; mold release agents such as waxes (e.g., carnauba wax) and fatty acids (e.g., stearic acid) and metal salts thereof; pigments such as carbon black, cobalt blue, and red iron oxide; flame retardants such as antimony oxide and halides; surface treating agents such as γ-glycidoxypropyltrimethoxysilane; coupling agents such as epoxysilanes, vinylsilanes, boron compounds and alkyl titanates; antioxidants, other additives, and mixtures thereof.

The epoxy resin compositions of the invention may be prepared by mixing and agitating the necessary components uniformly, and milling the mixture in milling means preheated at 70° to 95° C., for example, a kneader, roll mill and extruder, followed by cooling and comminution. The order of mixing the components is not critical.

The compositions of the invention are advantageously applicable in encapsulating various types of semiconductor device including SOP, SOJ, PLCC, and flat pack types. The compositions can be molded by conventional methods including transfer molding, injection molding, and casting. Most often, the epoxy resin compositions are molded at a temperature of about 150° to about 180° C. and post cured at a temperature of about 150° to about 180° C. for about 2 to about 16 hours.

The epoxy resin compositions of the invention comprising the specific components in admixture as defined above flow well and cure into low stressed products having a low modulus of elasticity, a low coefficient of expansion, a high glass transition temperature (irrespective of low stress), and low moisture absorption. Therefore, the semiconductor devices encapsulated with the epoxy resin compositions are highly reliable even after being subject to thermal shocks upon surface packaging.

EXAMPLE

Examples of the present invention are given below together with comparative examples, by way of illustration and not by way of limitation. All parts are by weight.

EXAMPLES 1-7 AND COMPARATIVE EXAMPLES 1-3

Epoxy resin compositions were prepared by uniformly melt mixing the following components in a hot two-roll mill, cooling and comminuting the mixtures. The components used were an epoxy resin, a phenolic resin, and a silicone-modified epoxy resin all shown below and used in the amounts shown in Table 1, 1 part of carnauba wax, 0.6 part of a curing catalyst shown below, 0.5 part of triphenylphosphine, 1.5 parts of γ-glycidoxypropyltrimethoxysilane, 1.5 parts of carbon black, 10 parts of $Sb_2O_3$, 300 parts of quartz powder (I), 200 parts of quartz powder (II), 70 parts of quartz powder (III) shown below.

| Epoxy resin | Epoxy equiv. | Softening point |
|---|---|---|
| (1) 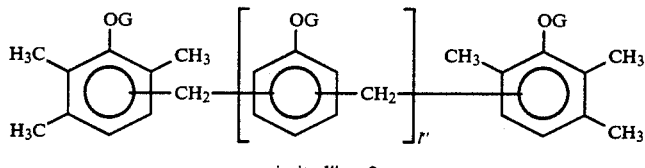 majority l″ = 2 | 197 | 65 |
| (2) 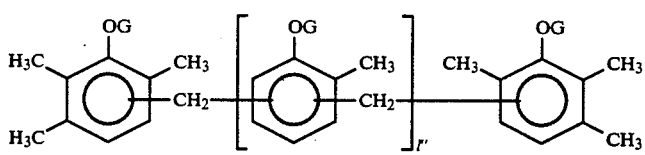 majority l″ = 2 | 198 | 65 |
| (3) 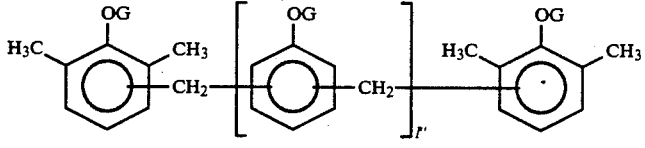 majority l″ = 2 | 192 | 61 |

-continued

| Epoxy resin | Epoxy equiv. | Softening point |
|---|---|---|
| (4) [structure with OG, CH₃, CH₂ groups; majority l″ = 2] | 190 | 65 |
| (5) [structure YX-4000 (Yuka Shell K.K.)] | 185 | 105 |
| (6) Cresol novolak type epoxy resin EOCN-1020-65 (Nihon Kayaku K.K.) | 198 | 64 |

| Phenolic resin | OH equiv. |
|---|---|
| (1) [structure with OH, CH₂, CH₃ groups] | 142 |
| (2) [structure with OH, CH₂, CH₃ groups] | 139 |
| (3) Phenol novolak resin KH3488H (Dai-Nihon Ink K.K.) | 110 |

Silicon-Modified Epoxy Resin

An addition reaction product between the following units having an organopolysiloxane content of 34% by weight and an epoxy equivalent of 310. Note that numerals attached to the parentheses are average values.

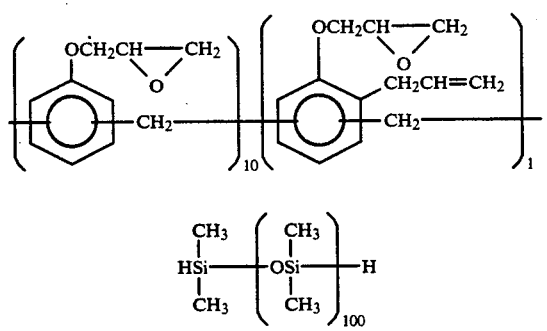

Curing Catalyst

It was prepared by mixing 1,8-diazabicyclo(5.4.0)undecene-7 and phenol novolak resin TD2131 (manufactured by Dai-Nihon Ink K.K.) in a weight ratio of 20/80, heat melting them at 130° C. for 30 minutes, and atomizing to a size of less than 50 μm.

Quartz Powders (I) Spherical fused silica having a specific surface area of 1.5 m²/g and a mean particle size of 30 μm (the content of coarse particles of more than 75 μm being less than 0.1 wt %).

(II) Ground fused silica having a specific surface area of 2.5 m²/g and a mean particle size of 6 μm (the content of coarse particles of more than 75 μm being 0.1 wt %).

(III) Spherical fused silica having a specific surface area of 10 m²/g and a mean particle size of 0.5 μm.

For these compositions, the following tests (A) to (F) were carried out. The results are shown in Table 1.

(A) Spiral flow

Using a mold according to the EMMI standard, measurement was made at 180° C. and 70 kg/cm².

(B) Flexural strength and Flexural modulus

Test bars of 10×4×100 mm which were molded at 180° C. and 70 kg/cm² for 2 minutes and post cured at 180° C. for 4 hours were tested at 215° C. according to JIS K6911.

(C) Coefficient of linear expansion (μ) and Glass transition temperature (Tg)

Using a dilatometer, test pieces of 4 mm in diameter and 15 mm long were examined by heating the test pieces at a rate of 5° C./min. Coefficient of linear expansion was measured over the range between 50° C. and 100° C.

(D) Crack resistance upon soldering after moisture absorption

Silicon chips of 2×6×0.4 mm were bonded to SO frames of 4×12×1.8 mm and then encapsulated with the epoxy resin compositions by molding at 175° C. for 2 minutes and post curing at 180° C. for 4 hours. The packages were allowed to stand in a hot humid atmosphere at 85° C. and RH 85% for 24 and 48 hours and then immersed for 10 seconds in a solder bath at 240° C. Then the packages were disintegrated to observe the occurrence of internal cracks. Reported is the number of cracked packages/the total number of packages tested.

The package used in this test is shown in FIG. 1 as comprising a silicon chip 1, a frame 2, and an encapsulating resin 3. Cracks 4 develop in the resin 3.

(E) Moisture resistance

4-M DRAM chips were bonded to SOJ frames with 20 pins and then encapsulated with the epoxy resin compositions by molding at 180° C. for 2 minutes and post curing at 180° C. for 4 hours. The packages were allowed to stand for 24 hours in a hot humid atmosphere at 121° C. and RH 100%, then dipped for 10 seconds in a solder bath at 260° C., and again allowed to stand for 300 hours in a hot humid atmosphere at 121° C. and RH 100%. Reported is the number of Al wire broken packages/the total number of packages tested.

(F) Water absorption

Disks of 50 mm in diameter and 2 mm thick were molded at 180° C. and 70 kg/cm² for 2 minutes and post cured at 180° C. for 4 hours. The disks were subjected to a pressure cooker test (PCT) at 121° C./100% RH for 24 hours before the water absorption (percent) was measured.

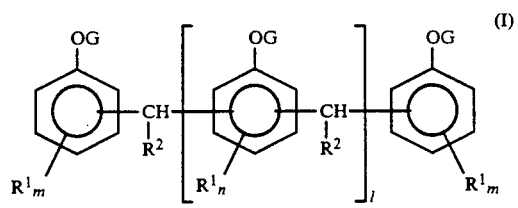

wherein
G is

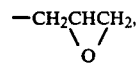

$R^1$ is independently selected from alkyl groups having 1 to 10 carbon atoms,
$R^2$ is a hydrogen atom or a group represented by the formula (a):

TABLE 1

| | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| Epoxy resin (1) | 39.5 | — | — | — | 40.0 | — | 52.3 | 45.0 | — | — | — |
| Epoxy resin (2) | — | 39.6 | — | 40.0 | — | — | — | — | — | — | — |
| Epoxy resin (3) | — | — | 39.1 | — | — | 39.5 | — | — | — | — | — |
| Epoxy resin (4) | 8 | 8 | 8 | 8 | 8 | 8 | 8 | 8 | 8 | 8 | 8 |
| Epoxy resin (5) | — | — | — | — | — | — | — | — | — | — | 44.4 |
| Epoxy resin (6) | — | — | — | — | — | — | — | — | 45.8 | 39.7 | — |
| Phenolic resin (1) | 37.5 | 37.4 | 37.9 | — | — | — | 39.7 | — | — | 37.3 | — |
| Phenolic resin (2) | — | — | — | 37.0 | 37.0 | 37.5 | — | — | — | — | — |
| Phenolic resin (3) | — | — | — | — | — | — | — | 32.0 | 31.8 | — | 32.6 |
| Silicone - modified epoxy resin | 15 | 15 | 15 | 15 | 15 | 15 | — | 15 | 15 | 15 | 15 |
| Spiral flow, inch | 30 | 31 | 32 | 30 | 29 | 30 | 39 | 30 | 29 | 28 | 38 |
| Flexural strength, kg/mm² | 1.9 | 1.8 | 2.0 | 1.9 | 1.9 | 2.0 | 2.0 | 1.8 | 1.7 | 1.7 | 1.0 |
| Flexural modulus, kg/mm² | 90 | 90 | 100 | 80 | 80 | 100 | 150 | 230 | 240 | 200 | 70 |
| Tg, °C. | 164 | 165 | 162 | 165 | 165 | 160 | 165 | 162 | 162 | 162 | 132 |
| μ, $10^{-5}$/°C. | 1.2 | 1.2 | 1.2 | 1.2 | 1.2 | 1.2 | 1.3 | 1.3 | 1.4 | 1.2 | 1.4 |
| Crack resistance | | | | | | | | | | | |
| 85° C./85% RH 24 hr. | 0/20 | 0/20 | 0/20 | 0/20 | 0/20 | 0/20 | 0/20 | 10/20 | 20/20 | 0/20 | 3/20 |
| 85° C./85% RH 48 hr. | 0/20 | 0/20 | 1/20 | 0/20 | 0/20 | 1/20 | 0/20 | 20/20 | 20/20 | 2/20 | 5/20 |
| Moisture resistance | 0/30 | 0/30 | 1/30 | 0/30 | 0/30 | 1/30 | 1/30 | 20/30 | 30/30 | 0/30 | 20/20 |
| Water absorption, % | 0.42 | 0.43 | 0.44 | 0.43 | 0.43 | 0.44 | 0.42 | 0.54 | 0.64 | 0.46 | 0.62 |

As seen from Table 1, the epoxy resin compositions within the scope of the present invention are free flowing and cure to products having low modulus of elasticity, a low coefficient of expansion, high Tg, and minimized water absorption. Then the semiconductor devices encapsulated with the present compositions have improved crack resistance upon soldering after moisture absorption and moisture resistance and remain highly reliable even after being subject to thermal shocks upon surface packaging.

Although some preferred embodiments have been described, many modifications and variations may be made thereto in the light of the above teachings. It is therefore to be understood that within the scope of the appended claims, the invention may be practiced otherwise than as specifically described.

We claim:

1. An epoxy resin composition comprising
(A) an epoxy resin of the general formula I:

wherein $R^1$ and G are as defined above and j is an integer of from 0 to 4, and
letter m is 3, n is an integer of from 0 to 3, and l is an integer of from 0 to 4
(B) a phenolic resin having at least one substituted or unsubstituted naphthalene ring in a molecule, and
(C) an inorganic filler.

2. The epoxy resin composition of claim 1 wherein epoxy resin (A) has the following formula:

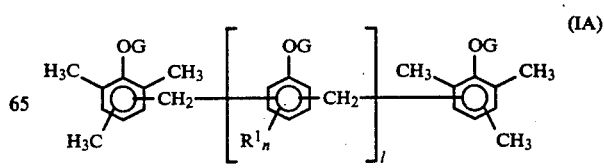

wherein $R^1$, G, n and l are as defined above.

3. The epoxy resin composition of claim 1 wherein phenolic resin (B) contains 5 to 80% by weight of naphthalene ring based on the total weight of epoxy resin (A) and phenolic resin (B).

4. The epoxy resin composition of claim 1 wherein components (A) and (B) contain epoxy and phenolic hydroxyl groups in such quantities that the molar ratio of epoxy group to phenolic hydroxyl group ranges from ½ to 3/2.

5. The epoxy resin composition of claim 1 wherein 100 to 1,000 parts by weight of filler (C) is present per 100 parts by weight of components (A) and (B) combined.

6. A epoxy resin composition of claim 1 which further comprises (D) a silicone-modified epoxy or phenolic resin.

7. A semiconductor device encapsulated with the epoxy resin composition of any one of claims 1 to 6 in cured state.

8. An epoxy resin composition comprising
(A) an epoxy resin of the general formula (I):

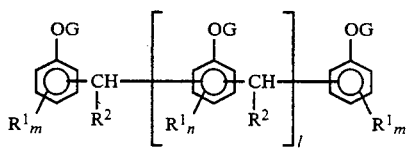

wherein
G is

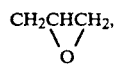

$R^1$ is independently selected from alkyl groups having 1 to 10 carbon atoms,
$R^2$ is a hydrogen atom or a group represented by the formula (a):

 (a)

wherein $R^1$ and G are as defined above and j is an integer of from 0 to 4, and
letter m is 3, n is an integer of from 0 to 3, and l is an integer of from 0 to 4
(B) a phenolic resin having at least one substituted or unsubstituted naphthalene ring in a molecule, and
(C) an inorganic filler, wherein components (A) and (B) contain epoxy and phenolic hydroxyl groups in such quantities that the molar ratio of epoxy group to phenolic hydroxyl group ranges from ½ to 3/2, and wherein 100 to 1,000 parts by weight of filler (C) is present per 100 parts by weight of components (A) and (B) combined.

* * * * *